United States Patent [19]

Gardziella et al.

[11] Patent Number: 4,584,329
[45] Date of Patent: Apr. 22, 1986

[54] HARDENABLE MOLDING MASSES AND THEIR USE

[75] Inventors: Arno Gardziella, Witten; Peter Adolphs; Alois Kwasniok, both of Iserlohn, all of Fed. Rep. of Germany

[73] Assignee: Ruetgerswerke Aktiengesellschaft, Frankfurt, Fed. Rep. of Germany

[21] Appl. No.: 714,747

[22] Filed: Mar. 22, 1985

[30] Foreign Application Priority Data

Mar. 30, 1984 [DE] Fed. Rep. of Germany ....... 3411827

[51] Int. Cl.⁴ ................................................. C08K 3/38
[52] U.S. Cl. .................................. 523/145; 524/404; 524/405; 524/701
[58] Field of Search ............... 523/139, 142, 143, 144, 523/145, 146, 147, 148, 445; 524/183, 184, 185, 404, 405, 701

[56] References Cited

U.S. PATENT DOCUMENTS

| | | | |
|---|---|---|---|
| 2,606,887 | 8/1952 | Pearce | 524/405 |
| 2,606,888 | 8/1952 | Williams et al. | |
| 3,182,030 | 5/1965 | Parkes | 523/145 |
| 3,875,106 | 4/1975 | Lazzaro | 523/445 |
| 4,016,111 | 4/1977 | Wolff et al. | 524/183 |

FOREIGN PATENT DOCUMENTS

| | | | |
|---|---|---|---|
| 56-10544 | 2/1981 | Japan | 524/183 |
| 59-24740 | 2/1984 | Japan | 524/405 |

Primary Examiner—Lewis T. Jacobs
Attorney, Agent, or Firm—Beveridge, De Grandi & Weilacher

[57] ABSTRACT

Hardenable molding masses are disclosed containing an organic binder material, fillers and additives wherein the binder material after the shaping and hardening is pyrolytically decomposed. The development of harmful substances such as aromatic hydrocarbons is considerably reduced through the addition of a boron containing compound.

1 Claim, No Drawings

HARDENABLE MOLDING MASSES AND THEIR USE

The present invention relates to hardenable molding masses formed of organic binder materials and conventional fillers and additives, by which the binder material after the shaping and the hardening of the mass is pyrolytically decomposed. Moldable masses of this type have a great importance in the foundry art for the manufacture of castings and cores as well as for the fabrication of fire resistant products and carbon industrial materials.

For these purposes, the organic binder materials serve in an advantageous manner to contribute necessary green strength to the respective formed products.

At the burning stage or during the casting process, the organic binder materials are pyrolytically decomposed. However with this desired process, there is produced a considerable amount of gaseous harmful substances (see Giessereitechnik 26 (1980) 213-216 and VDG Merkblätter R 303, R 304, R 305 and R 306). Among the most dangerous of these harmful substances are aromatic hydrocarbons such as diphenyl, trimethylbenzol, xylol, toluol and especially benzene.

It is the object of the present invention to provide hardenable molding masses which can be produced in a simple, economic fashion and which possesses properties which are not less desirable than the conventional molding masses and in which there is very little or no aromatic hydrocarbon evolved by the pyrolytic decomposition.

The objects of the invention are attained by providing molding masses wherein organic binder materials are employed together with conventional fillers and additive materials so that the resulting compositions can be shaped and thereafter the binder material may be decomposed in the pyrolytic process and which contain 2 to 20% by weight based on the amount of binder material of one or more boric acid compounds. In particular, the boric acid compound includes boric acid itself, esters of boric acid, and the like. Suitable binder materials are phenolic aldehyde condensation products or epoxy resins which are known in the art. These molding masses are most suitable for the manufacture of fire resistant products such as shaped forms and cores in the foundry industry.

The utilization of boron compounds in hardenable polymeric binder materials, and in particular the binders which are based on phenol-formaldehyde condensation products is known. This is described in DE-PS No. 537 367 which discloses a method for the increase in the melting point of a novolac through the addition of small amounts of boric acid or boric anhydride.

U.S. Pat. No. 2,606,888 describes molding masses formed of novolac and hexamethylentetramine which contain 0.1 to 15 weight percent of boric acid as a result of which the boric acid increases the plasticity of the masses and the velocity with which hardening can be accomplished.

According to British Pat. No. 1,055,637, a boric acid salt is used as the boron compound for combination with a phenolic resin and hexamethylentetramine.

As shown in U.S. Pat. No. 2,889,241, boric acid is combined with a phenolic resol in order to thicken the mixture. The resulting mass is used as an adhesive for fibers and plywood.

It is known from U.S. Pat. No. 2,864,782 to use boric acid to harden a hardenable resin such as phenolic, melamine, or urea resins.

According to German Pat. No. 1,089,167, epoxy resins can be hardened with boron trioxide and in German Pat. No. 1,545,056, boric acid esters are utilized for this purpose.

In U.S. Pat. No. 3,332,911, there is described the use of boric acid or salts thereof for the condensation of phenols with aldehydes. The resulting boron containing phenolic resins are characterized by very good control over hardening.

In all of the above noted prior art, there is described as an additional advantage with regard to the use of boron compounds for hardening or for modification of resins that the resulting hardened masses possess a superior thermal stability.

However, in the manufacture of molding masses for the foundry and for fire resistant products or carbon industrial products, a high thermal resistance of the binder is not an advantage and indeed is undesired. The binder materials should be pyrolytically decomposed with the formation of a carbon framework.

In spite of this reservation, it has been demonstrated that the hardenable boron containing molding masses can be utilized without any problems for the above mentioned purposes without there arising an undesirable change in the profile of physical properties necessary for these purposes.

Subsequently, it was surprisingly discovered that with the pyrolytic decomposition of the boron containing molding masses or the formed bodies produced therefrom in accordance with the present invention, produce virtually no or only small amounts of the lower molecular aromatic hydrocarbons. As a result, environmental and ecological damage is reduced by the introduction of boron compounds in hardenable molding masses formed of organic binder materials and conventional fillers and additive substances wherein the binder material is pyrolytically decomposed following a shaping and hardening process.

In accordance with the present invention, hardenable molding masses are unshaped mixtures containing 5 to 50 weight percent of an organic binder material together with 50 to 95 weight percent of fillers and additive substances which with the introduction of mechanical means are formed into preshaped masses for the production of fire resistant products, carbon industrial materials or cores and forms for the foundry art. These preformed masses are hardened through the introduction of pressure and/or heat. By means of additional increase in temperature, the organic binder material is pyrolytically decomposed so that a stable carbon structure remains which is required for the strength of the products obtained thereby.

Organic binders of a wide variety can be used such as all fluid or solid oligomeric or polymeric compositions which through cross linking or condensation reactions can be converted to an infusable condition, wherein these hardening reactions take place through the use of heat and/or through reaction with a hardening material. Examples of such classes of binders include phenol resins, polyesters, epoxy resins based on bisphenol A or bisphenol F or furan resins. Typical phenol resins are all condensation products based on one or more reactive group containing phenols with one or more aldehydes whereby a condensation reaction can take place in acid or in an alkaline medium. In the same way, epoxy resins can be used which are modified with furan, lignin, urea, isocyanide, melamin or epoxy compounds. These materials are all known in the art.

Filler materials quantitatively form the largest portion of the hardenable molding materials of the invention and according to the range of applications are more or less finely divided materials such as for example quartz sand, magnesium oxide, dolomite, clay, fire clay, carbon, silicon carbide, aluminum oxide, perlite, vermiculite, slag or flue ash. Any suitable inert filler may be used for this purpose.

In addition to the filler materials, there may be introduced into the molding masses in accordance with conventional polymer and industrial applications, additional additives such as for example, parting agents, lubricants, hardeners, accelerators, catalysts, retarding agents, wetting agents or stabilizing materials such as the type which have been long used in conventional mixtures. The individual ingredients are mixed in a known manner so that molding materials are produced which can then be formed and hardened within a prearranged period of time or which are stable at room temperature and which after shaping with heat or contact with the reaction gas can be hardened. See German Pat. No. 22 39 835 or German application No. 31 00 157.

According to the invention, there may be used boric acid containing compounds which are inorganic as well as organic boron compounds. Illustrative of the inorganic boric acid compounds are boron trioxide, metaboric acid, orthoboric acid as well as salts thereof and adducts such as for example ammonium borate, glycerin boric acid or hexamethylene tetraminborate. As organic boron compounds, there may be used in accordance with the invention, the aliphatic as well as the aromatic boric acid esters, boric acid, borin acid or boroxine as well as the anhydrides of boron acid, but also phenol-aldehyde condensation presence of boric acid or a borate (see DE-AS No.1 149 167) and in which boron is built into the polymer backbone. These and other suitable boron containing compounds which may be used in accordance with the present invention are known in the art.

The boron compounds are used in an amount of 2 to 20% by weight based on the finished molding mass. Further changes in the compositions of the molding masses relative to the conventional formulations of known molding masses are, for the most part, are not necessary. Likewise, it can occur that with the introduction of the boric acid into a phenolic resin or epoxy resin containing masses that with regard to the operation of the hardening material, the remaining amounts of hardening agents can be reduced.

The invention is illustrated through the following representative examples:

EXAMPLE 1

20 g of a commercial phenolic-novolac-resin (molar ratio of phenol/formaldehyde 1:0.84) having a melting point of 100° C. is finely ground with 4 g boric acid and 2 g hexamethylentetramine. The mixture is mixed with sand in the ratio of 1:5 and is then hardened for 2 hours at 150° C. The hardened material is then vaporized and is pyrolyzed at 750° C in a stream of nitrogen. The pyrolysate is analyzed by gas chromatography. It is analyzed to contain essentially phenols, ammonia, methane, carbon monoxide and carbon dioxide. No volatile aromatic hydrocarbons were found.

EXAMPLE 2

500 g of a commerical phenol-novolac-resin according to Example 1 were melted and 100 g of ammonium pentaborate suspended in 100 g of water were slowly introduced into the melt at 150° C. After homogenization, the water is removed through vacuum distillation and the resin is recovered and ground up. 20 g of this resin were finely ground with 2 g of hexamethylentetramine and the powdered resin was mixed with sand in the ratio of 1:5. The sand resin mixture was then hardened at 150° C for 2 hours, pulverized and then pyrolyzed at 750° C in a stream of nitrogen. The volatile portions did not show any aromatic hydrocarbons.

EXAMPLE 3

This example was carried out following the procedure in accordance with Example 1 using 1 g boric acid and 20 g of the novolac and 2 g of hexamethylentetramine. Pyrolysis was conducted at 750° C and there was obtained 0.3 mg volatile aromatic hydrocarbons per gram of resin.

EXAMPLE 4

This example was carried out according to Example 2 with 20 g of ammonium pentaborate per 500 g phenol-novolac. Pyrolysis was conducted at 750° C and there was obtained 0.2 mg volatile aromatic hydrocarbons per gram of resin.

EXAMPLE 5

This example was carried out in accordance with Example 1 with a commerical phenol resol (molar ratio of phenol/formaldehyde was 1:1.24) having a melting point of 80° C as the resin without the addition of hexamethylenetetramine. At the pyrolysis conducted at 750° C, there was no volatile aromatic hydrocarbon determined.

EXAMPLE 6

This example was carried out in accordance with Example 4 with a commerical phenol-resol identical to that in Example 5 as the solid resin without the addition of hexamethylenetretramine. With the pyrolysis at 750° C, there was obtained approximately 0.2 mg of volatile aromatic hydrocarbon per gram of resin mixture.

EXAMPLE 7

With the acid condensation of a phenol-formaldehyde novolac (pheno/formaldehyde ratio of 1:0.7), there was added 10% by weight boric acid triphenyl ester based on the sum of phenol and formaldehyde. After the distillation of the water, a resin was obtained having a melting point of 90° C. 20 g of this resin were mixed with 2 g hexamethylenetetramine and 80 g of sand and then following the procedure in Example 1 the sand resin mix was hardened and pyrolyzed. There was no volatile aromatic hydrocarbon determinable.

EXAMPLE 8

20 g of a mixture of phenol-novolac resin according to Example 1 and phenol-resol according to Example 5 in the ratio of 60:40 were ground with 4 g of boric acid. This mixture was then mixed with sand in the ratio of 1:5 and was hardened at 150° C for 2 hours. With the pyrolysis carried out in accordance with Example 1, there was obtained no volatile aromatic hydrocarbons.

EXAMPLE 9

30 g of an acid condensed furan resin (furfurylalcohol/formaldehyde ratio 1:0.6) are thinned with 10 g furfuryl alcohol (viscosity 15,000 mPa s), and is converted with 20 g methylethylketone peroxide, (50% in a desensitizing material) and 4 g boric acid and this mixture then was mixed with 1 kg sand. This mass was hardened by subjecting it to sulfur dioxide gas (2 seconds) and was subsequently tempered at 150° for 2 hours. With the pyrolysis carried out according to Example 1, no volatile aromatic hydrocarbons could be observed.

EXAMPLE 10

40 g of a mixture of 80% by weight of a commercial epoxy resin formed of bisphenol A with an epoxy equivalent of 188 and 20 weight percent of trimethylolpropane triacrylate was converted with 10 g of cumolhydroproxide and 4 g boric acid and this mixture was then mixed with 1 kg sand. This mass was hardened in accordance with the procedure in Example 9 and then pyrolyzed. With the pyrolysis, no volatile aromatic hydrocarbons could be observed.

COMPARATIVE EXAMPLE 1

20 g of the phenol-novolac resin according to Example 1 and 2 g of hexamethylene tetramine were mixed with sand in the ratio of 1:5 and was hardened at 150° C for 2 hours. The hardened material was then pyrolyzed at 750° C in a stream of nitrogen and the volatile components were analyzed. In addition to phenols, methane, ammonia and carbon monoxide, there was observed to be present aromatic hydrocarbons such as benzene, toluol, xylol in an amount of 2 mg per gram of resin.

COMPARATIVE EXAMPLE 2

Following the same procedure as in Comparative Example 1, a phenol resol solid resin in accordance with Example 5 was used as the resin component. With the pyrolysis at 750° C, there was obtained 1.5 mg volatile aromatic hydrocarbons per gram of resin.

COMPARATIVE EXAMPLE 3

In accordance with Example 9, there was formed a furan resin mixture without, however, boric acid which was then hardened and pyrolyzed. The pyrolysis gases contained 1.2 mg volatile aromatic hydrocarbons per gram of resin.

COMPARATIVE EXAMPLE 4

Following the procedure in Example 10, an epoxy resin was obtained without, however, the boric acid which was then hardened and pyrolyzed. The pyrolysis gases contain 1.4 mg volatile aromatic hydrocarbons per gram of resin.

Further variations and modifications of the foregoing invention will be apparent to those skilled in the art from a reading of the foregoing and accordingly are encompassed by the claims appended hereto.

The German priority document No. P 34 11 827.6 is relied on and incorporated herein by reference.

We claim:

1. Hardenable molding masses comprising organic binders, at least one inert finely divided filler and 2 to 20% by weight based on the binder material of one or more boron containing compounds, said molding mass being capable of being shaped into a desired shape and hardened, said binder being a phenol aldehyde condensation product wherein the condensation is carried out in the presence of a boric acid compound and being capable of pyrolytic decomposition.

* * * * *